United States Patent
Betensky et al.

4,159,165
Jun. 26, 1979

[54] ZOOM LENS

[75] Inventors: Ellis I. Betensky, Toronto, Canada; John A. Lawson, Dayton, Ohio

[73] Assignee: Vivitar Corporation, Santa Monica, Calif.

[21] Appl. No.: 750,829

[22] Filed: Dec. 15, 1976

[51] Int. Cl.² ............................................. G01B 15/16
[52] U.S. Cl. ..................................... 350/176; 350/184
[58] Field of Search ................ 350/184, 186, 214, 176

[56] References Cited
U.S. PATENT DOCUMENTS

| | | | |
|---|---|---|---|
| 3,143,590 | 4/1964 | Higuchi | 350/184 |
| 3,771,853 | 11/1973 | Nakamura | 350/184 |
| 3,848,969 | 11/1974 | Tajima | 350/184 |

FOREIGN PATENT DOCUMENTS

2557547  7/1976  Fed. Rep. of Germany ........... 350/184

*Primary Examiner*—Conrad J. Clark
*Attorney, Agent, or Firm*—DeLio and Montgomery

[57] ABSTRACT

A zoom lens having a wide field angle and two movable groupings to vary the equivalent focal length, the front grouping comprising a front positive group, a negative group comprising a plurality of negative elements, and a rear positive group. In zooming the rear grouping moves forward to increase the equivalent focal length while the front grouping moves backward to maintain the image plane. The front grouping is independently movable for focusing.

29 Claims, 5 Drawing Figures

ZOOM LENS

This invention relates to zoom lenses and more particularly relates to zoom lenses wherein the zooming range of equivalent focal lengths lies predominantly in what is referred to as a wide angle field of view.

The desirability of a compact small diameter, wide angle zoom lens particularly for use with single lens reflex cameras is well appreciated. The difficulties in designing such a lens, however, are extreme and multiple. If the lens is to cover approximately an 80° field angle in its shortest focal length position, then the ratio of equivalent focal length to back focal length ratio must be about 0.625 or less. This condition determines the necessity of a retrofocus lens type.

Such a lens has been designed in a relatively simple form as shown in U.S. Pat. No. 3,143,590. The requirements for compactness and small diameter may be satisfied if the gaussian properties are properly selected and the entire zooming and compensating motions are achieved with basic negative and positive groups of the retrofocus lens groups. In the lens shown in the aforementioned patent, however, the aberrations are not well corrected. Specifically the distortion and coma vary excessively. One method of improving the aberration corrections is to employ multiple lens motions as shown in U.S. Pat. No. 3,771,853. This lens has achieved improved correction, partially due to the variation of spacings of lens elements during zooming.

It is not necessary to add additional motions to the two basic component motions first described. If the gaussian properties are properly selected a field angle of 40° to 80° may be achieved with as few as nine elements, if such elements are constructed and arranged in the proper manner.

Such improved properties are achieved in the present invention through the provision of a lens having a first negative grouping and a second positive grouping. During zooming,, from the lower focal length to the upper focal length, the rear positive grouping moves forward while the front negative grouping moves rearwardly maintaining the position of the image plane.

The first grouping in one form thereof comprises from the object to image end a first positive group in the form of a convex object side meniscus, a second group in the form of a plurality of negative menisci and a third positive group in the form of a meniscus having a convex object side surface. The second grouping comprises a first positive group including a cemented doublet and a second positive group of fairly conventional construction.

The negative grouping presents to the positive grouping a converging beam for field rays and a diverging beam for axial rays. For this reason, the aberration correction at the two ends of the focal length range tend to conflict. In the negative group, it has been determined that introducing a final positive group slightly air-spaced from the preceding negative elements provides correction for astigmatism and distortion, particularly at the lower focal length without introducing large amounts of spherical aberration, and further that coma may then partially be corrected in the second grouping. Additionally, it has been determined that using a positive element in the first position of the negative grouping further improves the distortion and astigmatism correction without adding uncorrectable aperture dependent aberrations. This is particularly important in a lens of the type where the aperture defining mechanism moves during zooming and the aperture thus requires modification as a function of focal length in order to maintain constant relative aperture. For example, the diameter of the entrance pupil when at the longer focal length range may have a maximum relative aperture of f/3.5. If the same diameter were maintained at the shorter focal length range, the relative aperture would be f/1.6. The lens powers of the first grouping are selected to permit simultaneous correction of distortion and lateral color while having a minimal contribution to spherical aberration. With this accomplished, the second grouping can then be of simplified construction, also being corrected for distortion.

An object of this invention is to provide a new and improved zoom lens.

Another object of this invention is to provide a new and improved zoom lens where the equivalent focal length range of the lens is predominantly less than the diagonal of the image frame.

A further object of this invention is to provide a new and improved wide angle zoom lens of the retrofocus type in which aberrations are reduced to an insignificant and acceptable level.

The features of the invention which are believed to be novel are particularly pointed out and distinctly claimed in the concluding portion of the specification. The invention, however, both as to its operation and organization together with further objects and advantages thereof may best be appreciated by reference to the following detailed description taken in conjunction with the drawings wherein:

In the following description each element is identified by L followed by a numeral. The two major groupings are identified by GP1 and GP2, and the surfaces are identified by R followed by a numeral.

Figure 2:
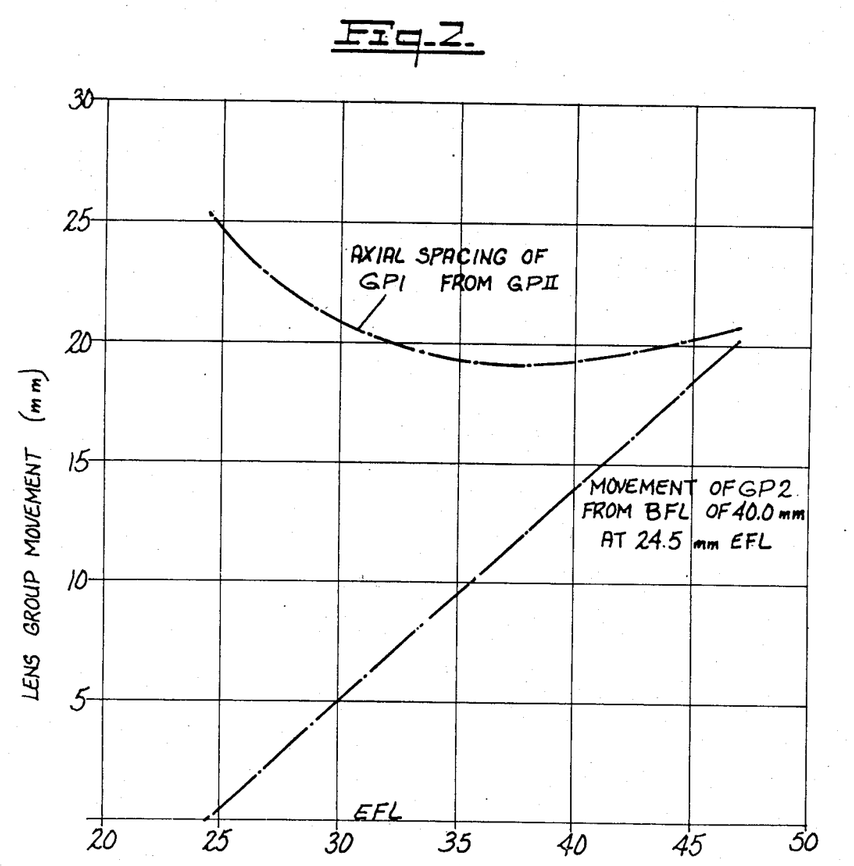
FIG. 2 is a chart showing the lens group movements as a function of equivalent focal length of the lens of FIG. 1.

The lens in all forms comprises a first grouping GP1 of negative power and a second grouping GP2 of positive power. Grouping GP2 moves forward to increase the equivalent focal length of the lens while grouping GP1 simultaneously moves rearwardly with motions as shown in FIG. 2. Such motions may be achieved through the lens mechanism disclosed in co-pending application Ser. No. 750,828 filed Dec. 15, 1976, now 4,141,636.

Figure 1:
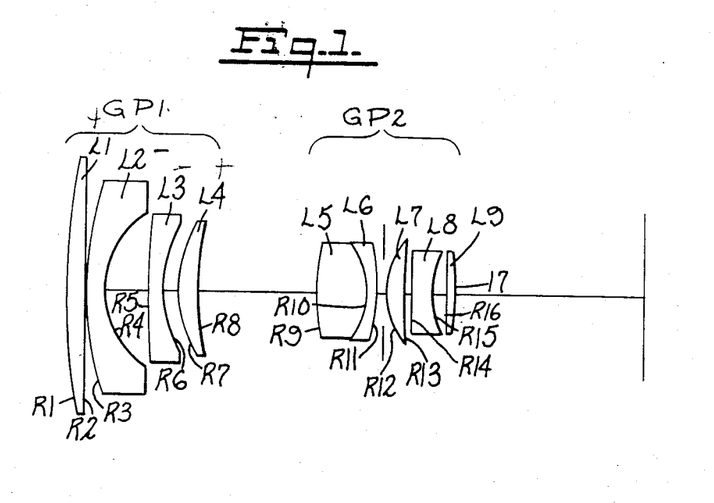
FIG. 1 is a diagram of a lens embodying the invention.
Figure 3:
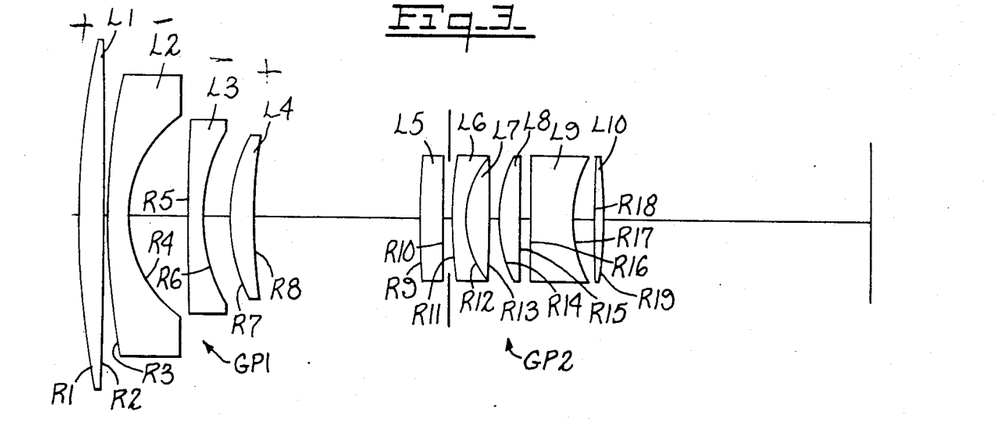
FIGS. 3–5 are diagrams of additional lenses embodying the invention.
Figure 4:
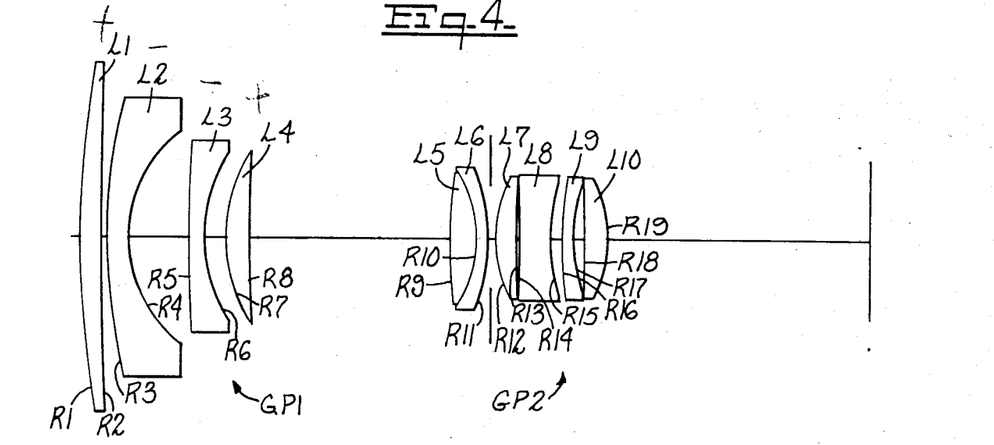

Grouping GP1 of FIGS. 1, 3 and 4 comprises four elements L1-L4 arranged as a first positive group element L1, a second negative group, elements L2 and L3 and a rear positive group, element L4. Elements L1-L4 move in fixed relation to each other.

Figure 5:
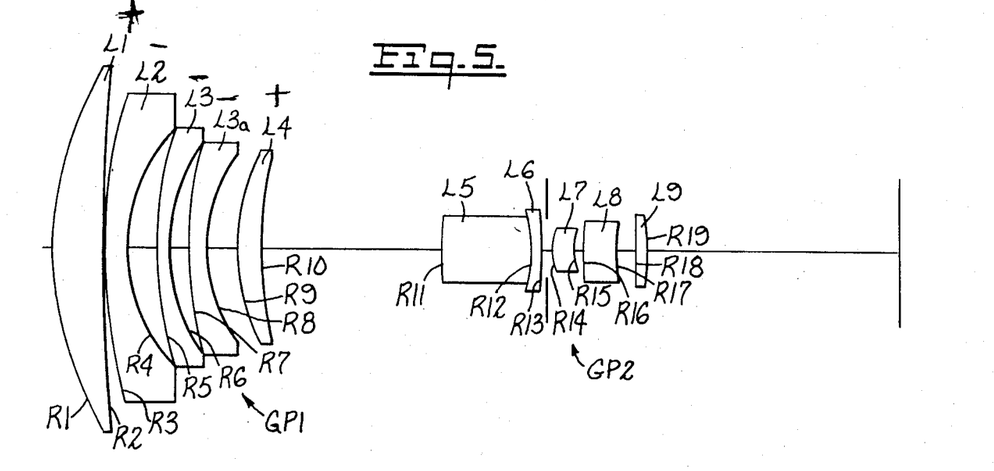

Grouping GP1 of FIG. 5 comprises a first positive group element L1, a second negative group, elements L2, L3 and L3a, and a rear positive group L4. Elements L1-L4 move in fixed relation to each other.

Grouping GP2, as shown in FIG. 1, comprises elements L5-L9. Elements L5 and L6 comprise a relatively thick doublet having both forward and rear surfaces convex, and a rear positive group comprised of elements L7, L8 and L9 generally in the form of a Cooke triplet. Tables I and II set forth prescriptions of lenses as shown in FIG. 1.

In all examples grouping GP2 comprises a front positive group of relatively large thickness between front and rear convex surfaces along the optical axis, L5, L6 (FIGS. 1, 4 and 5; and L6, L7 and L8 (FIG. 3); and includes a bi-convex doublet. In the forms shown where the maximum relative aperture is approximately f/3.5 or greater the rear grouping conveniently takes the general form of a Cooke triplet as shown in FIGS. 1 and 3, and 5, or a modification with an additional negative element as shown in FIG. 4. If the lens is designed for a greater relative aperture, then other forms of the rear group of the second grouping may be utilized.

Two forms of the lens of FIG. 4 are set forth in Tables IV and V. In the lens of Table VI the aperture stop is placed closely before surface R9, while in the lens of Table V, the aperture stop is located closely behind surface R11. In the lens of Tables IV and V, the rear group of grouping GP2 is modified from that of FIGS. 1 and 3 by addition of the meniscus L9. FIG. 5 and Table VI exemplify a lens where the overall negative power of the front grouping GP1 is divided into three negative elements L2-L3a.

The prescriptions of lens of FIGS. 1 and 3-5 are set forth in the following Tables I-VI.

In the following tables, the lens elements and surface radii are designated with reference to the Figures. The axial distance between the radial surfaces of the elements is measured along the optical axis. $N_d$ is the index of refraction and $V_d$ is the Abbe number as derived from the glass identification number.

A lens as shown in FIG. 1 scaled to an equivalent focal length of 24.5 to 47.00 mm for a 24×36 mm image frame and having a relative aperture of f/3.65 is set forth in Table I.

TABLE I

| | | Surface Radius (mm) | Axial Distance Between Surfaces | $N_d$ | $V_d$ |
|---|---|---|---|---|---|
| L1 | R1 | 138.914 | | | |
| | | | 4.311 | 1.723 | 38.0 |
| | R2 | 5555.863 | | | |
| | | | .100 | | |
| | R3 | 81.344 | | | |
| L2 | | | 3.494 | 1.743 | 49.2 |
| | R4 | 19.449 | | | |
| | | | 9.955 | | |
| | R5 | 243.412 | | | |
| L3 | | | 2.500 | 1.620 | 60.3 |
| | R6 | 28.774 | | | |
| | | | 3.383 | | |
| | R7 | 28.163 | | | |
| L4 | | | 4.000 | 1.757 | 31.8 |
| | R8 | 59.412 | | | |
| | | | 25.302 | | |
| | R9 | 45.909 | | | |
| L5 | | | 11.122 | 1.582 | 42.0 |
| | R10 | −19.127 | | | |
| L6 | | | 2.100 | 1.785 | 25.7 |
| | R11 | −45.507 | | | |
| | | | 2.000 | | |
| | R12 | 19.705 | | | |
| L7 | | | 3.500 | 1.593 | 35.5 |
| | R13 | 144.587 | | | |
| | | | 1.814 | | |
| | R14 | −226.943 | | | |
| L8 | | | 4.305 | 1.785 | 26.9 |
| | R15 | 19.181 | | | |
| | | | 2.922 | | |
| | R16 | 158.438 | | | |
| L9 | | | 2.193 | 1.804 | 46.5 |
| | R17 | −35.460 | | | |

The back focal length varies from 40.0 mm to 60.1 mm as the equivalent focal length of the lens varies from the lower value to the upper value. The axial spacing between groupings GP1 and GP2 decreases to 0.63 mm at the upper equivalent focal length.

A lens as shown in FIG. 1 scaled to an equivalent focal length of 24.5 to 47.0 mm for a 24×36 mm image frame, and having a relative aperture of f/3.65 is set forth in Table II.

TABLE II

| | | Surface Radius (mm) | Axial Distance Between Surfaces | $N_d$ | $V_d$ |
|---|---|---|---|---|---|
| | R1 | 78.741 | | | |
| L1 | | | 4.311 | 1.621 | 62.4 |
| | R2 | 423.928 | | | |
| | | | 0.100 | | |
| | R3 | 74.864 | | | |
| L2 | | | 3.444 | 1.804 | 46.5 |
| | R4 | 20.421 | | | |
| | | | 8.562 | | |
| | R5 | 351.059 | | | |
| L3 | | | 2.500 | 1.627 | 59.1 |
| | R6 | 26.808 | | | |
| | | | 5.218 | | |
| | R7 | 29.438 | | | |
| L4 | | | 4.000 | 1.762 | 28.6 |
| | R8 | 66.197 | | | |
| | | | 26.357 | | |
| | R9 | 51.010 | | | |
| L5 | | | 15.146 | 1.599 | 39.8 |
| | R10 | −19.747 | | | |
| L6 | | | 2.100 | 1.790 | 25.5 |
| | R11 | −41.271 | | | |
| | | | 2.000 | | |
| | R12 | 18.823 | | | |
| L7 | | | 3.500 | 1.603 | 37.7 |
| | R13 | 123.648 | | | |
| | | | 1.062 | | |
| | R14 | −105.973 | | | |
| L8 | | | 5.319 | 1.798 | 25.5 |
| | R15 | 19.915 | | | |
| | | | 2.213 | | |
| | R16 | −482.108 | | | |
| L9 | | | 2.193 | 1.844 | 45.6 |
| | R17 | −30.111 | | | |

The back focal length varies from 40.0 mm to 59.8 mm as the equivalent focal length of the lens varies from the lower value to the upper value. The axial spacing between groupings GP1 and GP2 decreases to 0.01 at upper equivalent focal length.

A lens as shown in FIG. 3 scaled to an equivalent focal length of 24.5 to 47.0 mm for an image frame of 24×36 mm and having a relative aperture of f/3.8 as set forth in Table III.

TABLE III

| | | Surface Radius (mm) | Axial Distance Between Surfaces | $N_d$ | $V_d$ |
|---|---|---|---|---|---|
| | R1 | 138.914 | | | |
| L1 | | | 4.311 | 1.723 | 38.0 |
| | R2 | −4499.984 | | | |
| | | | 0.200 | | |
| | R3 | 81.344 | | | |
| L2 | | | 3.494 | 1.743 | 49.2 |
| | R4 | 19.449 | | | |
| | | | 9.955 | | |
| | R5 | 243.411 | | | |
| L3 | | | 2.500 | 1.620 | 60.3 |
| | R6 | 28.774 | | | |
| | | | 4.278 | | |
| | R7 | 28.163 | | | |
| L4 | | | 4.000 | 1.757 | 31.8 |
| | R8 | 59.412 | | | |
| | | | 26.678 | | |
| | R9 | 70.251 | | | |
| L5 | | | 4.000 | 1.582 | 42.0 |
| | R10 | 405.396 | | | |
| | | | 1.000 | | |
| | R11 | 48.480 | | | |

TABLE III-continued

|  | Surface Radius (mm) | Axial Distance Between Surfaces | $N_d$ | $v_d$ |
| --- | --- | --- | --- | --- |
| L6 |  | 2.500 | 1.757 | 26.9 |
| R12 | 15.070 |  |  |  |
| L7 |  | 3.400 | 1.584 | 41.6 |
| R13 | −385.591 |  |  |  |
|  |  | 1.700 |  |  |
| R14 | 19.361 |  |  |  |
| L8 |  | 3.500 | 1.593 | 35.5 |
| R15 | 194.059 |  |  |  |
|  |  | 1.814 |  |  |
| R16 | 872.546 |  |  |  |
| L9 |  | 6.633 | 1.785 | 26.1 |
| R17 | 19.239 |  |  |  |
|  |  | 2.922 |  |  |
| R18 | 132.125 |  |  |  |
| L10 |  | 2.193 | 1.804 | 46.5 |
| R19 | −36.867 |  |  |  |

The back focal length varies from 40.0 mm to 59.9 mm as the equivalent focal length of the lens varies from the lower value to the upper value. The axial spacing between groupings GP1 and GP2 decreases to 0.50 mm at the upper equivalent focal length.

A lens as shown in FIG. 4 scaled to an equivalent focal length of 24.5 to 47.5 mm for an image frame of 24×36 mm, and having a relative aperture of f/3.8 is set forth in Table IV.

TABLE IV

|  | Surface Radius (mm) | Axial Distance Between Surfaces | $N_d$ | $v_d$ |
| --- | --- | --- | --- | --- |
| R1 | 138.914 |  |  |  |
| L1 |  | 4.31 | 1.723 | 38.0 |
| R2 | 1344.100 |  |  |  |
|  |  | .20 |  |  |
| R3 | 81.344 |  |  |  |
| L2 |  | 3.49 | 1.743 | 49.2 |
| R4 | 23.258 |  |  |  |
|  |  | 9.96 |  |  |
| R5 | 243.411 |  |  |  |
| L3 |  | 2.50 | 1.773 | 49.6 |
| R6 | 24.659 |  |  |  |
|  |  | 3.98 |  |  |
| R7 | 28.163 |  |  |  |
| L4 |  | 4.00 | 1.699 | 30.1 |
| R8 | 115.448 |  |  |  |
|  |  | 28.03 |  |  |
| R9 | 57.556 |  |  |  |
| L5 |  | 5.00 | 1.589 | 42.0 |
| R10 | −17.206 |  |  |  |
| L6 |  | 1.80 | 1.805 | 25.5 |
| R11 | −31.637 |  |  |  |
|  |  | 1.00 |  |  |
| R12 | 19.584 |  |  |  |
| L7 |  | 3.50 | 1.673 | 32.2 |
| R13 | 158.949 |  |  |  |
|  |  | .61 |  |  |
| R14 | −133.809 |  |  |  |
| L8 |  | 4.57 | 1.805 | 25.5 |
| R15 | 23.426 |  |  |  |
|  |  | 1.65 |  |  |
| R16 | 57.142 |  |  |  |
| L9 |  | 2.97 | 1.805 | 25.5 |
| R17 | 25.594 |  |  |  |
|  |  | 1.67 |  |  |
| R18 | 504.434 |  |  |  |
| L10 |  | 3.70 | 1.670 | 47.2 |
| R19 | −25.540 |  |  |  |

The back focal length varies from 39.0 mm to 58.3 mm as the equivalent focal length of the lens varies from the lower value to the upper value. The axial spacing between groupings GP1 and GP2 decreases to 0.1 mm at the upper equivalent focal length.

A lens as shown in FIG. 4 scaled to an equivalent focal length of 24.5 to 47.5 mm for an image frame of 24×36 mm, and having a relative aperture of f/3.8 is set forth in Table V.

TABLE V

|  | Surface Radius (mm) | Axial Distance Between Surfaces | $N_d$ | $v_d$ |
| --- | --- | --- | --- | --- |
| R1 | 138.914 |  |  |  |
| L1 |  | 4.311 | 1.723 | 38.0 |
| R2 | 990.767 |  |  |  |
|  |  | 0.200 |  |  |
| R3 | 81.344 |  |  |  |
| L2 |  | 3.494 | 1.743 | 49.2 |
| R4 | 20.721 |  |  |  |
|  |  | 9.955 |  |  |
| R5 | 243.411 |  |  |  |
| L3 |  | 2.500 | 1.773 | 49.6 |
| R6 | 27.546 |  |  |  |
|  |  | 2.991 |  |  |
| R7 | 28.163 |  |  |  |
| L4 |  | 4.000 | 1.699 | 30.1 |
| R8 | 135.640 |  |  |  |
|  |  | 29.281 |  |  |
| R9 | 53.061 |  |  |  |
| L5 |  | 4.500 | 1.589 | 41.0 |
| R10 | −17.264 |  |  |  |
| L6 |  | 1.800 | 1.805 | 25.5 |
| R11 | −31.658 |  |  |  |
|  |  | 1.004 |  |  |
| R12 | 19.357 |  |  |  |
| L7 |  | 3.500 | 1.673 | 32.2 |
| R13 | 161.010 |  |  |  |
|  |  | 0.613 |  |  |
| R14 | −128.704 |  |  |  |
| L8 |  | 4.567 | 1.805 | 25.5 |
| R15 | 23.528 |  |  |  |
|  |  | 1.853 |  |  |
| R16 | 61.099 |  |  |  |
| L9 |  | 2.000 | 1.805 | 25.5 |
| R17 | 24.798 |  |  |  |
|  |  | 1.705 |  |  |
| R18 | 838.558 |  |  |  |
| L10 |  | 3.700 | 1.670 | 47.2 |
| R19 | −24.833 |  |  |  |

The back focal length varies from 39.0 mm to 58.4 mm as the equivalent focal length of the lens varies from the lower value to the upper value. The axial spacing between groupings GP1 and GP2 decreases to 2.29 mm at the upper equivalent focal length.

A lens as shown in FIG. 5 scaled to an equivalent focal length of 24.5 to 47.0 mm for an image frame of 24×36 mm, and having a relative aperture of f/3.65 is set forth in Table VI.

TABLE VI

|  | Surface Radius (mm) | Axial Distance Between Surfaces | $N_d$ | $v_d$ |
| --- | --- | --- | --- | --- |
| R1 | 56.156 |  |  |  |
| L1 |  | 7.293 | 1.517 | 64.2 |
| R2 | 320.266 |  |  |  |
|  |  | .100 |  |  |
| R3 | 83.131 |  |  |  |
| L2 |  | 3.444 | 1.804 | 46.5 |
| R4 | 25.469 |  |  |  |
|  |  | 5.142 |  |  |
| R5 | 75.186 |  |  |  |
| L3 |  | 2.000 | 1.804 | 46.5 |
| R6 | 28.026 |  |  |  |
|  |  | 2.864 |  |  |
| R7 | 63.621 |  |  |  |
| L3a |  | 2.500 | 1.643 | 48.0 |
| R8 | 26.621 |  |  |  |
|  |  | 4.844 |  |  |
| R9 | 30.017 |  |  |  |
| L4 |  | 4.000 | 1.805 | 25.5 |
| R10 | 75.243 |  |  |  |
|  |  | 28.258 |  |  |
| R11 | 55.230 |  |  |  |

TABLE VI-continued

| Surface Radius (mm) | | Axial Distance Between Surfaces | $N_d$ | $V_d$ |
|---|---|---|---|---|
| L5 | | 14.150 | 1.603 | 38.0 |
| | R12 −18.062 | | | |
| L6 | | 2.100 | 1.805 | 25.5 |
| | R13 −38.684 | | | |
| | | 2.000 | | |
| | R14 18.81 | | | |
| L7 | | 3.500 | 1.596 | 39.2 |
| | R15 116.243 | | | |
| | | 1.062 | | |
| | R16 −102.385 | | | |
| L8 | | 5.319 | 1.785 | 25.7 |
| | R17 20.230 | | | |
| | | 2.213 | | |
| | R18 −232.898 | | | |
| L9 | | 2.193 | 1.786 | 43.9 |
| | R19 −26.201 | | | |

The back focal length varies from 40.1 mm to 59.1 mm as the equivalent focal length of the lens varies from the lower value to the upper value. The axial spacing between groupings GP1 and GP2 decreases to 1.0 mm at the upper equivalent focal length.

As previously stated, it is the general form of the first grouping which is most important and particularly the positive groups thereof. The final positive group, air spaced from the preceding negative group, permits the provision of correction for astigmatism and distortion without introducing large amounts of spherical aberration at the wide angle limit of the zoom range and permits coma to be corrected in the second grouping.

The provision of a first positive group, element L1, in the front negative grouping improves the distortion and astigmatism correction without adding uncorrectable aperture-dependent aberrations.

In the simplest form the negative group of grouping GP1 comprises two negative elements. The negative power of the first grouping may be further subdivided into three elements as shown in FIG. 5; resulting in further improved distortion correction without introducing aperture-dependent operations which would be difficult to correct.

The second grouping consists of two main groups, the first having convex object and image side surfaces and including a cemented doublet. This group images the virtual object presented by the first front negative grouping at a very great distance, essentially infinity. The second group forms a real image at the film plane. The placing of the aperture stop between the two groups of the second grouping, or in front of the first group permits a smaller diameter of the front negative grouping without excessive vignetting. The first group, which is relatively thick between subtending convex surfaces and includes a bi-convex doublet, contributes to the positive power of the lens with minimum contribution to field curvature due to its thickness.

The EFLS, in millimeters, of the elements and groupings of the various lens are set forth in the following table.

TABLE VII

| | | L1 | L2 | L3 | L3a | L4 | GP1 | GP2 |
|---|---|---|---|---|---|---|---|---|
| Table | I | 196.1 | −35.1 | −52.6 | | 66.6 | −37.6 | 33.6 |
| | II | 153.8 | −35.7 | −43.6 | | 66.6 | −39.1 | 34.5 |
| | III | 200.0 | −35.1 | −52.6 | | 62.5 | −40.8 | 34.4 |
| | IV | 212.8 | −45.5 | −56.5 | | 52.6 | −41.2 | 34.7 |
| | V | 222.2 | −38.5 | −40.0 | | 50.0 | −41.0 | 34.5 |
| | VI | 130.0 | −46.7 | −58.8 | −73.0 | 60.0 | −34.8 | 34.5 |

It will be noted that in all cases the second positive group of the first grouping has a convex object side surface and a thickness substantially one-sixth of the lower EFL of the lens.

The spacing between the last negative element of the first grouping and the last positive group varies from 0.10 to 0.25 of the lower EFL of the lens.

The first positive group of the first grouping has a thickness of 0.15 to 0.35 of the lower EFL of the lens.

When the foregoing ranges of EFL's and thicknesses are maintained the lens is well corrected for the aberrations discussed in the introductory portion of this specification.

The axial thickness of the first group of the rear grouping is between one-fourth and three-fourths of the lower EFL of the lens.

The EFL of the rear positive group of the first grouping is always greater than twice the lower EFL of the lens. The ratio of the EFL of the first positive group of the first grouping to the EFL of the rear positive grouping is between two and five, and the EFL of the first positive group of the first grouping is at least five times the lower EFL of the lens.

The foremost negative element in the front grouping has an EFL from one to two times the shorter EFL of the lens.

Various modifications may be made in the disclosed lenses. For example, the lower EFL may be increased by decreasing the spacing between groups GP1 and GP2. The lens of Table I may be changed to a 28 mm to 47 mm EFL range by decreasing the spacing between elements L4 and L5 to 18.5 mm. The rear positive element L4 of grouping GP1 may be made as a doublet to correct for aperture dependent aberrations if the lens is designed with a larger maximum relative aperture.

In all disclosed embodiments, focusing is accomplished by independent movement of grouping GP1.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A zoom lens comprising a front negative grouping and a rear positive grouping, said groupings being axially movable at predetermined rates to vary the equivalent focal length while maintaining the position of the focal plane, said front grouping consisting of a front positive group including a positive front element, a rear positive group and a negative group therebetween.

2. The lens of claim 1 wherein said negative group comprises two menisci concave to the image.

3. The lens of claim 1 wherein said negative group comprises three menisci concave to the image.

4. The lens of claim 1 wherein said rear grouping comprises a first positive group and a second positive group, said first positive group having convex object and image side surfaces and including a bi-convex doublet.

5. The lens of claim 4 wherein the axial distance between the object and image side surfaces of said first group of said rear grouping is 0.25 to 0.75 of the shorter equivalent focal length of said lens.

6. The lens of claim 1 wherein said front positive group comprises a positive element convex to the object, said rear positive group comprising an element convex to the object, and said negative group having a front side convex to the object and a rear side concave to the image.

7. The lens of claim 1 wherein the ratio of the equivalent focal length of said first positive group of said front grouping to the equivalent focal length of the rear positive group of said front grouping is 2.0 to 5.0.

8. The lens of claim 1 wherein the equivalent focal length of the first positive group of the first grouping is at least five times the lower equivalent focal length of said lens.

9. The lens of claim 1 wherein the foremost negative element on the object end of said first grouping has an equivalent focal length whose absolute value is from one to two times the lower limit equivalent focal length of said lens.

10. The lens of claim 1 wherein the axial spacing between said rear positive group of said front grouping and the preceding negative element is between 0.1 and 0.25 of the lower limit equivalent focal length of said lens.

11. The lens of claim 2 as scaled to an equivalent focal length of 24.5 to 47.0 mm for a 24×36 mm image frame, substantially as described below:

|  |  | Surface Radius (mm) | Axial Distance Between Surfaces (mm) | $N_d$ | $V_d$ |
|---|---|---|---|---|---|
| L1 | R1 | 138.914 |  |  |  |
|  |  |  | 4.311 | 1.723 | 38.0 |
|  | R2 | 5555.863 |  |  |  |
|  |  |  | .100 |  |  |
|  | R3 | 81.344 |  |  |  |
| L2 |  |  | 3.494 | 1.743 | 49.2 |
|  | R4 | 19.449 |  |  |  |
|  |  |  | 9.955 |  |  |
|  | R5 | 243.412 |  |  |  |
| L3 |  |  | 2.500 | 1.620 | 60.3 |
|  | R6 | 28.774 |  |  |  |
|  |  |  | 3.383 |  |  |
|  | R7 | 28.163 |  |  |  |
| L4 |  |  | 4.000 | 1.757 | 31.8 |
|  | R8 | 59.412 |  |  |  |
|  |  |  | 25.302 |  |  |
|  | R9 | 45.909 |  |  |  |
| L5 |  |  | 11.122 | 1.582 | 42.0 |
|  | R10 | −19.127 |  |  |  |
| L6 |  |  | 2.100 | 1.785 | 25.7 |
|  | R11 | −45.507 |  |  |  |
|  |  |  | 2.000 |  |  |
|  | R12 | 19.705 |  |  |  |
| L7 |  |  | 3.500 | 1.593 | 35.5 |
|  | R13 | 144.587 |  |  |  |
|  |  |  | 1.814 |  |  |
|  | R14 | −226.943 |  |  |  |

-continued

|  |  | Surface Radius (mm) | Axial Distance Between Surfaces (mm) | $N_d$ | $V_d$ |
|---|---|---|---|---|---|
| L8 |  |  | 4.305 | 1.785 | 26.9 |
|  | R15 | 19.181 |  |  |  |
|  |  |  | 2.922 |  |  |
|  | R16 | 158.438 |  |  |  |
| L9 |  |  | 2.193 | 1.804 | 46.5 |
|  | R17 | −35.460 |  |  |  | where L1-L9 are lens elements with surfaces defined on radii R1-R7, $N_d$ and $V_d$ are the indexes of refraction and Abbe numbers, respectively, as determined from the glass identification number, and where the axial distance between surfaces R8 and R9 varies with equivalent focal length.

12. The lens of claim 2 as scaled to an equivalent focal length of 24.5 to 47.5 mm for a 24×36 mm image frame, substantially as described below:

|  |  | Surface Radius (mm) | Axial Distance Between Surfaces (mm) | $N_d$ | $V_d$ |
|---|---|---|---|---|---|
|  | R1 | 78.741 |  |  |  |
| L1 |  |  | 4.311 | 1.621 | 62.4 |
|  | R2 | 423.928 |  |  |  |
|  |  |  | 0.100 |  |  |
|  | R3 | 74.864 |  |  |  |
| L2 |  |  | 3.444 | 1.804 | 46.5 |
|  | R4 | 20.421 |  |  |  |
|  |  |  | 8.562 |  |  |
|  | R5 | 351.059 |  |  |  |
| L3 |  |  | 2.500 | 1.627 | 59.1 |
|  | R6 | 26.808 |  |  |  |
|  |  |  | 5.218 |  |  |
|  | R7 | 29.438 |  |  |  |
| L4 |  |  | 4.000 | 1.762 | 28.6 |
|  | R8 | 66.197 |  |  |  |
|  |  |  | 26.357 |  |  |
|  | R9 | 51.010 |  |  |  |
| L5 |  |  | 15.146 | 1.599 | 39.8 |
|  | R10 | −19.747 |  |  |  |
| L6 |  |  | 2.100 | 1.790 | 25.5 |
|  | R11 | −41.271 |  |  |  |
|  |  |  | 2.000 |  |  |
|  | R12 | 18.823 |  |  |  |
| L7 |  |  | 3.500 | 1.603 | 37.7 |
|  | R13 | 123.648 |  |  |  |
|  |  |  | 1.062 |  |  |
|  | R14 | −105.973 |  |  |  |
| L8 |  |  | 5.319 | 1.798 | 25.5 |
|  | R15 | 19.915 |  |  |  |
|  |  |  | 2.213 |  |  |
|  | R16 | −482.108 |  |  |  |
| L9 |  |  | 2.193 | 1.844 | 45.6 |
|  | R17 | −30.111 |  |  |  | where L1-L9 are lens elements with surfaces defined on radii R1-R17, $N_d$ and $V_d$ are the indexes of refraction and Abbe numbers, respectively, of lens elements L1-L9 as determined from the glass identification number, and where the axial distance between surfaces R8 and R9 varies with equivalent focal length.

13. The lens of claim 2 as scaled to an equivalent focal length of 24.5 to 47.0 mm for a 24×36 mm image frame, substantially as described below:

|  |  | Surface Radius (mm) | Axial Distance Between Surfaces (mm) | $N_d$ | $V_d$ |
|---|---|---|---|---|---|
|  | R1 | 138.914 |  |  |  |
| L1 |  |  | 4.311 | 1.723 | 38.0 |
|  | R2 | −4499.984 |  |  |  |
|  |  |  | 0.200 |  |  |

-continued

|  | | Surface Radius (mm) | Axial Distance Between Surfaces (mm) | $N_d$ | $V_d$ |
|---|---|---|---|---|---|
| L2 | R3 | 81.344 | | | |
|  | | | 3.494 | 1.743 | 49.2 |
|  | R4 | 19.449 | | | |
|  | | | 9.955 | | |
| L3 | R5 | 243.411 | | | |
|  | | | 2.500 | 1.620 | 60.3 |
|  | R6 | 28.774 | | | |
|  | | | 4.278 | | |
| L4 | R7 | 28.163 | | | |
|  | | | 4.000 | 1.757 | 31.8 |
|  | R8 | 59.412 | | | |
|  | | | 26.678 | | |
| L5 | R9 | 70.251 | | | |
|  | | | 4.000 | 1.582 | 42.0 |
|  | R10 | 405.396 | | | |
|  | | | 1.000 | | |
| L6 | R11 | 48.480 | | | |
|  | | | 2.500 | 1.757 | 26.9 |
|  | R12 | 15.070 | | | |
| L7 | | | 3.400 | 1.584 | 41.6 |
|  | R13 | −385.591 | | | |
|  | | | 1.700 | | |
|  | R14 | 19.361 | | | |
| L8 | | | 3.500 | 1.593 | 35.5 |
|  | R15 | 194.059 | | | |
|  | | | 1.814 | | |
|  | R16 | 872.546 | | | |
| L9 | | | 6.633 | 1.785 | 26.1 |
|  | R17 | 19.239 | | | |
|  | | | 2.922 | | |
|  | R18 | 132.125 | | | |
| L10 | | | 2.193 | 1.804 | 46.5 |
|  | R19 | −36.867 | | | | where L1-L10 are lens elements with surfaces defined on radii R1-R19, $N_d$ and $V_d$ are the indexes of refraction and Abbe numbers, respectively, of lens elements L1-L9 as determined from the glass identification number, and where the axial distance between surfaces R8 and R9 varies with equivalent focal length.

14. The lens of claim 2 as scaled to an equivalent focal length of 24.5 to 47.5 mm for a 24×36 mm image frame, substantially as described below:

|  | | Surface Radius (mm) | Axial Distance Between Surfaces (mm) | $N_d$ | $V_d$ |
|---|---|---|---|---|---|
| L1 | R1 | 138.914 | | | |
|  | | | 4.31 | 1.723 | 38.0 |
|  | R2 | 1344.100 | | | |
|  | | | .20 | | |
| L2 | R3 | 81.344 | | | |
|  | | | 3.49 | 1.743 | 49.2 |
|  | R4 | 23.258 | | | |
|  | | | 9.96 | | |
| L3 | R5 | 243.411 | | | |
|  | | | 2.50 | 1.773 | 49.6 |
|  | R6 | 24.659 | | | |
|  | | | 3.98 | | |
| L4 | R7 | 28.163 | | | |
|  | | | 4.00 | 1.699 | 30.1 |
|  | R8 | 115.448 | | | |
|  | | | 28.03 | | |
| L5 | R9 | 57.556 | | | |
|  | | | 5.00 | 1.589 | 42.0 |
|  | R10 | −17.206 | | | |
| L6 | | | 1.80 | 1.805 | 25.5 |
|  | R11 | −31.637 | | | |
|  | | | 1.00 | | |
|  | R12 | 19.584 | | | |
| L7 | | | 3.50 | 1.673 | 32.2 |
|  | R13 | 158.949 | | | |
|  | | | .61 | | |
|  | R14 | −133.809 | | | |
| L8 | | | 4.57 | 1.805 | 25.5 |

|  | | Surface Radius (mm) | Axial Distance Between Surfaces (mm) | $N_d$ | $V_d$ |
|---|---|---|---|---|---|
|  | R15 | 23.426 | | | |
|  | | | 1.65 | | |
|  | R16 | 57.142 | | | |
| L9 | | | 2.97 | 1.805 | 25.5 |
|  | R17 | 25.594 | | | |
|  | | | 1.67 | | |
|  | R18 | 504.434 | | | |
| L10 | | | 3.70 | 1.670 | 47.2 |
|  | R19 | −25.540 | | | | where L1-L10 are lens elements with surfaces defined on radii R1-R19, $N_d$ and $V_d$ are the indexes of refraction and Abbe numbers, respectively, of lens elements L1-L9 as determined from the glass identification number, and where the axial distance between surfaces R8 and R9 varies with equivalent focal length.

15. The lens of claim 2 as scaled to an equivalent focal length of 24.5 to 47.0 mm for a 24×36 mm image frame, substantially as described below:

|  | | Surface Radius (mm) | Axial Distance Between Surfaces (mm) | $N_d$ | $V_d$ |
|---|---|---|---|---|---|
| L1 | R1 | 138.914 | | | |
|  | | | 4.311 | 1.723 | 38.0 |
|  | R2 | 990.767 | | | |
|  | | | 0.200 | | |
| L2 | R3 | 81.344 | | | |
|  | | | 3.494 | 1.743 | 49.2 |
|  | R4 | 20.721 | | | |
|  | | | 9.955 | | |
| L3 | R5 | 243.411 | | | |
|  | | | 2.500 | 1.773 | 49.6 |
|  | R6 | 27.546 | | | |
|  | | | 2.991 | | |
| L4 | R7 | 28.163 | | | |
|  | | | 4.000 | 1.699 | 30.1 |
|  | R8 | 135.640 | | | |
|  | | | 29.281 | | |
| L5 | R9 | 53.061 | | | |
|  | | | 4.500 | 1.589 | 41.0 |
|  | R10 | −17.264 | | | |
| L6 | | | 1.800 | 1.805 | 25.5 |
|  | R11 | −31.658 | | | |
|  | | | 1.004 | | |
|  | R12 | 19.357 | | | |
| L7 | | | 3.500 | 1.673 | 32.2 |
|  | R13 | 161.010 | | | |
|  | | | 0.613 | | |
|  | R14 | −128.704 | | | |
| L8 | | | 4.567 | 1.805 | 25.5 |
|  | R15 | 23.528 | | | |
|  | | | 1.853 | | |
|  | R16 | 61.099 | | | |
| L9 | | | 2.000 | 1.805 | 25.5 |
|  | R17 | 24.798 | | | |
|  | | | 1.705 | | |
|  | R18 | 838.558 | | | |
| L10 | | | 3.700 | 1.670 | 47.2 |
|  | R19 | −24.833 | | | | where L1-L10 are lens elements with surfaces defined on radii R1-R9, $N_d$ and $V_d$ are the indexes of refraction and Abbe numbers, respectively, of lens elements L1-L9 as determined from the glass identification number, and where the axial distance between surfaces R8 and R9 varies with equivalent focal length.

16. The lens of claim 3 as scaled to an equivalent focal length of 24.5 to 47.5 mm for a 24×36 mm image frame, substantially as described below:

| | Surface Radius (mm) | Axial Distance Between Surfaces (mm) | $N_d$ | $V_d$ |
|---|---|---|---|---|
| L1 R1 | 56.156 | | | |
| | | 7.293 | 1.517 | 64.2 |
| R2 | 320.266 | | | |
| | | .100 | | |
| L2 R3 | 83.131 | | | |
| | | 3.444 | 1.804 | 46.5 |
| R4 | 25.469 | | | |
| | | 5.142 | | |
| L3 R5 | 75.186 | | | |
| | | 2.000 | 1.804 | 46.5 |
| R6 | 28.026 | | | |
| | | 2.864 | | |
| L4 R7 | 63.621 | | | |
| | | 2.500 | 1.643 | 48.0 |
| R8 | 26.621 | | | |
| | | 4.844 | | |
| L5 R9 | 30.017 | | | |
| | | 4.000 | 1.805 | 25.5 |
| R10 | 75.243 | | | |
| | | 28.258 | | |
| L6 R11 | 55.230 | | | |
| | | 14.150 | 1.603 | 38.0 |
| R12 | −18.062 | | | |
| L7 | | 2.100 | 1.805 | 25.5 |
| R13 | −38.684 | | | |
| | | 2.000 | | |
| L8 R14 | 18.81 | | | |
| | | 3.500 | 1.596 | 39.2 |
| R15 | 116.243 | | | |
| | | 1.062 | | |
| L9 R16 | −102.385 | | | |
| | | 5.319 | 1.785 | 25.7 |
| R17 | 20.230 | | | |
| | | 2.213 | | |
| R18 | −232.898 | | | |
| L10 | | 2.193 | 1.786 | 43.9 |
| R19 | −26.201 | | | | where L1-L10 are lens elements with surfaces R1-R19, Nd and Vd are the indexes of refraction and Abbe numbers, respectively, of lens elements L1-L10 as determined from the glass identification number, and where the axial distance between surfaces R10 and R11 varies with equivalent focal length.

17. A zoom lens comprising a forward negative grouping and a rear positive grouping, said groupings being simultaneously movable at predetermined rates to vary the equivalent focal length of the lens, said forward grouping comprising from the object side a first positive element, a rear positive element convex to the object, and a negative group between said first and rear positive elements.

18. The lens of claim 17 where the equivalent focal length of the first positive element is about twice the lower limit equivalent focal length of the overall lens.

19. The lens of claim 17 where the ratio of equivalent focal length of said first positive element to the rear positive element is 2.0 to 5.0.

20. The lens of claim 17 where the equivalent focal length of said first positive element is 5.0 to 10.0 of the lower limit equivalent focal length of the lens.

21. The lens of claim 17 wherein the foremost negative element on the object end of said first grouping has an equivalent focal length whose absolute value is from one to two times the lower limit equivalent focal length of said lens.

22. The lens of claim 17 where the axial spacing between said rear positive element and the preceding negative element is 0.1 to 0.25 of the lower limit equivalent focal length of the lens.

23. The lens of claim 17 where said first positive element has an axial thickness of 0.15 to 0.35 of the lower limit equivalent focal length of the lens.

24. The lens of claim 17 where said first and rear positive elements are convex to the object and said negative group has a convex object side and a concave image side.

25. A zoom lens comprising a front grouping of overall negative power and a rear grouping of overall positive power, said groups being axially movable at predetermined rates to vary the equivalent focal length of said lens while maintaining the position of the focal plane, said front group comprising a front positive group having front positive elements, a rear positive group and a negative group therebetween, said rear grouping comprising a first positive group and a second positive group, said first positive group having convex object and image surfaces and including a bi-convex doublet, the axial distance between the object and image side surfaces of said first positive group being 0.25 to 0.75 of the lower limit equivalent focal length of said lens.

26. A zoom lens comprising a front grouping of overall negative power and a rear grouping of overall positive power, said groups being axially movable at predetermined rates to vary the equivalent focal length of said lens while maintaining the position of the focal plane, said front grouping comprising a front positive group, a rear positive group and a negative group therebetween, the equivalent focal length of said rear positive group being about twice the lower limit equivalent focal length of the lens.

27. The lens of claim 26 where the equivalent focal length ($F_R$) of said rear positive group is $$2.8F_o \geq F_R \geq 2F_o$$

where $F_o$ is the equivalent focal length of said lens.

28. A zoom lens comprising a front grouping of overall negative power and a rear grouping of overall positive power, said groups being axially movable at predetermined rates to vary the equivalent focal length of said lens while maintaining the position of the focal plane, said front grouping comprising a front positive group, a rear positive group and a negative group therebetween, the ratio of the equivalent focal lengths of said front positive group to said rear positive group being 2.0 to 5.0.

29. A zoom lens comprising a front grouping of overall negative power and a rear grouping of overall positive power, said groups being axially movable at predetermined rates to vary the equivalent focal length of said lens while maintaining the position of the focal plane, said front grouping comprising a front positive group, a rear positive group and a negative group therebetween, the ratio of the equivalent focal lengths of said front group to the lower limit equivalent focal length of the lens being 5.0 to 10.0.

* * * * *

UNITED STATES PATENT AND TRADEMARK OFFICE
CERTIFICATE OF CORRECTION

PATENT NO. : 4,159,165
DATED : June 26, 1979
INVENTOR(S) : ELLIS I. BETENSKY ET AL It is certified that error appears in the above-identified patent and that said Letters Patent are hereby corrected as shown below:

Column 5, line 65, "0.1mm" should read --1.0mm--.

Column 12, line 60, "R1-R9" should read --R1-R19--.

Signed and Sealed this

Ninth Day of October 1979

[SEAL]

Attest:

RUTH C. MASON
Attesting Officer

LUTRELLE F. PARKER
Acting Commissioner of Patents and Trademarks